US Patent Office
3,087,910
Patented Apr. 30, 1963

3,087,910
HYDRAZINO SUBSTITUTED DIAZINE AND TRIAZINE CURING COMPOUNDS FOR EPOXY RESINS
Robert L. Wear, West St. Paul, Minn., assignor to Minnesota Mining and Manufacturing Company, St. Paul, Minn., a corporation of Delaware
No Drawing. Filed Apr. 7, 1960, Ser. No. 20,564
6 Claims. (Cl. 260—47)

The present invention relates to normally stable, thermosetting epoxy resin compositions and more particularly relates to a new class of curing compounds for blending with epoxy resins to provide resinous compositions which remain in the uncured state indefinitely at normal room temperatures, and yet cure rapidly at moderately elevated temperatures to a tough, hard infusible state, in which state the compositions possess relatively unimpaired structural strength at considerably elevated temperatures. This application is a continuation-in-part of my copending application Serial No. 570,678, filed March 12, 1956, now abandoned.

Since epoxy resins are by themselves permanently thermoplastic, they ordinarily require the addition of curing agents or hardening compounds in the form of cross linking agents or other reactive materials before they can be heat cured to hard, infusible, resinous products. It is to such curing compounds and their addition to epoxy resins in the formation of thermosetting epoxy resin compositions that the present invention is directed.

Essentially, the present invention relates to a new class of curing compounds for epoxy resins, which when combined or blended therewith and heated, produce tough, hard products capable of retaining their structural strength at temperature ranges considerably higher than heretofore possible with low pressure, thermosetting epoxy resin compositions, and which novel curing compounds are sufficiently unreactive with epoxy resins at normal room temperatures to enable long term storage life of mixed epoxy and curing compound.

Many chemical hardening or curing agents are already known including organic acid anhydries such as maleic, pyromellitic, phthalic or hexahydrophthalic anhydride; amines, such as diethylamine or diethylenetriamine; and other agents including diisocyanates, urea-formaldehyde resins, dicyandiamide, etc. Further, because the reaction between the epoxy resin and the curing agent may proceed rather slowly, small amounts of accelerators or activators are sometimes included in the reactive composition. Examples of such accelerators are the amines, particularly tertiary amines, alkali phenoxides, Friedel-Crafts type catalysts, etc.

Because of the general lack of high temperature strength of heat-cured structural epoxy products and the desirability that the epoxy resin and curing agent or hardener be available for use as a preblended thermosetting resinous composition rather than as individual components, much research on curing agents has been directed toward the discovery of curing agents which, among other things, are non-reactive or only slowly reactive with epoxy resins at normal room temperatures, thereby to provide a long and preferably indefinite shelf life, and which cure to products having high strength retention at elevated temperatures to thereby enlarge the field of uses of epoxy compositions from their present boundaries.

Of course, other properties such as short curing times at moderately elevated temperatures, good pot life, that is, the ability of the resinous composition to remain at a desired consistency for reasonable periods of time at temperatures approaching their thermosetting temperatures without curing up, and the ability of the uncured resinous compositions to be returned from potting temperatures to normal room temperatures without seriously shortening the shelf life or curing characteristics of the compositions are also desirable and the epoxy compositions of this invention have been found to possess a remarkably good combination of these properties.

The production of a thermosetting epoxy resin having a long shelf life and wherein the cured product retains a considerable portion of its structural strength at elevated temperatures, has been a difficult one, and it is among the most important objects of this invention to provide a class of epoxy resin curing compounds, which when blended with epoxy resins cure the resins at moderately elevated temperatures to a tough, hard, infusible state in which they retain a major portion of their room temperature structural strength at temperatures approximating and sometimes exceeding 165° C., and which curing compounds appear to be completely unreactive with epoxy resins at normal room temperatures, thereby providing an indefinite shelf life.

Typical epoxy resins are those which are produced by the reaction of one or more mols of epichlorhydrin or the reaction of one or more mols of epichlorhydrin or glycerol dichlorhydrin with a mol of bisphenol A in the presence of a base such as sodium hydroxide and at elevated temperatures within the approximate range of 50°–150° C. The resinous glycidyl polyether obtained from epichlorhydrin and bisphenol A is a complex mixture rather than a single chemical compound, which has been represented by the following formula:

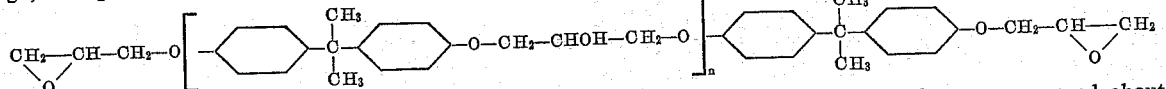

where $n$ has an average value between zero and about seven, depending for the most part on the relative proportions of bisphenol A and epichlorhydrin in the initial reaction mixture. A number of these epoxy resins are commercially available such as the "Epon" resins of the Shell Chemical Corporation, the "Araldite" resins of the Ciba Company and certain "Bakelite" resins of the Union Carbide and Carbon Corporation. These resins vary from the liquid state at ordinary room temperatures, for which $n$ in the above formula approaches 0, to high molecular weight solids having melting points well above 100° C.

Other polyhydric bisphenols, e.g. resorcinol or 2,2-bis-(4-hydroxy-phenyl) butane, as well as various trisphenols, may be substituted for the bisphenol A.

Other polyhydroxy compounds such as glycol or glycerol may be reacted with epichlorhydrin in the presence of boron trifluoride catalyst and the product converted with certain alkaline reagents to the liquid or resinous glycidyl polyether, having utility in the practice of this invention.

The chlorhydrin component likewise may be replaced by other compounds serving as equivalent reactive sources of epoxy radicals.

In all cases, the epoxy resin contains an average of more than one epoxy group,

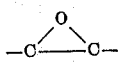

also called the oxirane group, per average molecular weight. Other liquid or resinous materials in which the average number of epoxy linkages per average molecular weight exceeds one have been produced by suitable treatment, e.g., with hydrogen peroxide and formic acid, of unsaturated materials such as soy bean oil, copolymers of butadiene with styrene, acrylonitrile, or acrylic acid, etc.; and these materials likewise, e.g., in admixture with the epoxy resins, have utility for the purposes of the invention. The preparation of these and equivalent epoxy-containing materials has been adequately described elsewhere and forms no part of the present invention.

The curing agents comprising this invention are the polyhydrazino derivatives of those 6-membered, carbo-nitrogen heterocyclic, conjugated ring compounds having from 2 to 3 nitrogen atoms as members of the ring, wherein the nitrogen atoms are separated from one another by at least one intervening carbon atom and wherein the hydrazino groups are carried by the ring carbon atoms. Included in these ring compounds are the 1,3-diazines (pyrimidines), and the 1,3,5-triazines. The specified derivatives of the aforementioned ring compounds when blended with epoxy resins provide thermosetting resin compositions which appear to be indefinitely stable at room temperatures and which cure to tough, hard, infusible products possessing remarkably good structural strength at elevated temperatures.

Particularly valuable are the triazines and certain of the pyrimidines, which comprise those 6-membered, carbo-nitrogen-heterocyclic, ring compounds which may be represented by the formula:

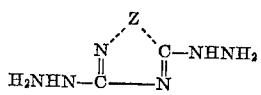

wherein Z is an asymmetrically substituted bivalent radical selected from the group consisting of $$-\overset{W}{\underset{}{C}}=\overset{X}{\underset{}{C}}- \quad \text{and} \quad -\overset{Y}{\underset{}{C}}=N-$$

wherein W is a substituent selected from the group consisting of hydrogen and chlorine, wherein X is a substituent selected from the group consisting of hydrogen and a lower alkyl containing from 1 to about 4 carbon atoms, and Y is a substituent selected from the group consisting of alkylamino, dialkylamino, and aralkylamino radicals containing from 1 to about 10 carbon atoms in the alkyl groups thereof, amino, hydrazino, and arylamino radicals, alkenylamino radicals containing from 2 to about 5 carbon atoms and

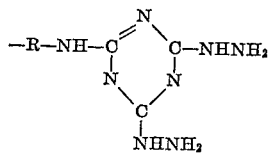

wherein R is a member selected from the group consisting of alkylene-amino and aralkylene-amino radicals containing from about 2 to about 10 carbon atoms in the alkylene groups. It is to be understood that W and X may be transposed between their parent carbon atoms without departing from the invention.

In addition to their remarkably good shelf life and the rigidity of their cured products at high temperatures, the curing agents of this invention provide thermosetting epoxy resin compositions which have excellent pot lives, which may be heated to temperatures approaching their curing temperatures, cooled, and reheated without deleterious effect, which are capable of rapid cure at moderately elevated temperatures, and the cured products of which are, in addition to possessing excellent strength retention at high temperatures, comparable or superior in other respects to heat cured epoxy resin compositions using other curing agents.

The absence of a carbonyl oxygen in the heterocyclic compounds is advantageous in that water will not split out of the compound when heated, which could cause bubbling in the curing system leading to unsatisfactory products.

The triazines have proven particularly useful as curing agents, notably the 2,4-dihydrazino-6-(substituted amino)-s-triazines which are represented by the formula:

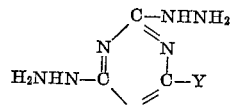

wherein Y is as previously defined.

The symmetrical triazines corresponding to the aforenoted structural formula may be obtained in high yields by the successive reaction of cyanuric chloride with the desired substituted amine at low temperatures followed by reaction with an excess (to suppress undesirable side reactions) of hydrazine hydrate at somewhat elevated temperatures, the reaction being:

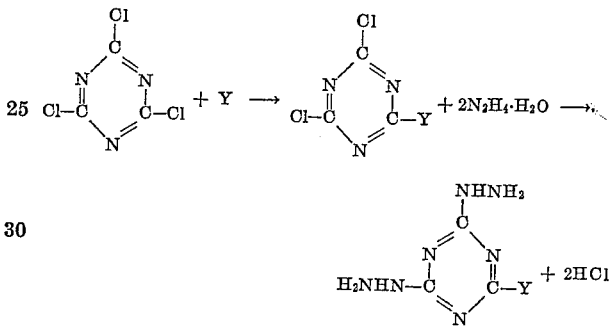

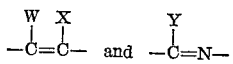

These substances appear to lead to cross linked epoxy resins of superior properties by a reaction which may be written in idealized form as:

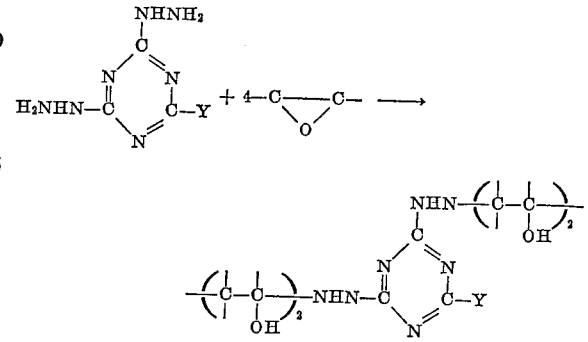

It is possible that those products in which Y contains a reactive hydrogen other than those of hydrazino groups may react further with another oxirane group in a similar fashion, but this does not seem particularly probable since resins prepared in which the ratio of epoxy equivalents per mole of dihydrazino carrying substituent was 5 showed no enhancement of properties, and the preferred ratio is approximately 4; another way of stating this is that the preferred ratio is one hydrazino group for each two epoxy equivalents.

These substances show unusual properties in latency of cure in that a protracted pot life is obtained at elevated temperatures, although only slight further temperature increase results in rapid hardening. Since the curing reaction is exothermic, the protracted pot life of the resins lends them readily to curing in stages during the first of which the resin is gelled and during the second of which final curing is achieved at temperatures elevated above the first stage. This procedure is advantageous in controlling the final product from charring, and along with the other characteristics mentioned, makes the epoxy resins of this invention among the most versatile available both as to handling ease and storage prior to curing, as well as to the range of utilization of the cured products, particularly in the field of high temperature stability, e.g., above 300° F.

In many of the examples illustrating the invention which follow, the epoxy resins used are the commercially available resins prepared from bisphenol A by reaction with epichlorhydrin. Among these resins are the "Epon" resins designated by the numbers 828, 834, and 864, and the "Bakelite" resin ERL 2774, or BR–18774, the former designation being stated by the manufacturer to be the successor of the latter. In those examples where the epoxy resins used are of other types, they will be specifically identified. Except where noted, the hydrazino derivatives are used in the proportion of two epoxy equivalents of the resin for each hydrazino group of the curing agent, that is, in an amount sufficient to provide one active hydrazino hydrogen atom for reaction with each epoxide group of the resin.

EXAMPLE 1

2,4-dihydrazino-6-diethylamino-s-triazine was prepared as follows: 18.5 grams of cyanuric chloride were dissolved in 40 ml. of dioxane, which was then added in a thin stream to 60 ml. of water at about 5° C. with stirring. Then 10.5 ml. of diethylamine (7.3 gms. of diethylamine) was added slowly, keeping the temperature below 5° C. Next 5.3 grams of $Na_2CO_3$ were added to the mixture and the about or below 5° C. temperature maintained for ½ hour. A residue formed, which when filtered and washed, was reslurried with 60 ml. of water. Then 46 ml. (0.8 mol) of 85% hydrazine hydrate was added at slowly increasing temperatures and the final mixture maintained at 80° C. for ½ hour. The resulting 2,4-dihydrazino-6-diethylamino-s-triazine precipitate filtered readily, then became "pasty" and gummy, finally drying to a yellowish granular mass. The found percentage of nitrogen in the sample was 49.5%, a reasonably good correlation of the calculated nitrogen percentage of 52.0%, considering that no attempt was made to purify the crude product.

To determine its use as a curing agent, 1.5 grams of the crude 2,4-dihydrazino-6-diethylamino triazine obtained above were powdered, mixed with 10 grams of a commercially available epoxy resin (Epon 864) and the resulting mixture cured for approximately two hours at approximately 120° C. The resulting casting was a tough, hard product which retained its structural rigidity up to a temperature of 120° C.

EXAMPLE 2

2,4-dihydrazino-6-phenylamino-s-triazine was prepared as follows: A solution of 18.5 g. cyanuric chloride in 40 ml. of warm dioxane was added to 60 ml. of cold water with stirring and, while maintaining the temperature at about 5° C., 4.5 ml. of aniline was added dropwise followed by 5.3 g. of sodium carbonate in 25 ml. of water and 46 ml. of hydrazine hydrate. The temperature rose to about 25° C. and the mixture was heated with stirring at 80–90° C. for about one hour. The mixture was cooled, the product collected, washed and dried at about 100° C. The product melted at about 210° C. and after recrystallization from a dioxane water solution, had a melting point of about 225° C. Analysis of the product showed C, 47%, H, 5.1%, and N, 45.0%, as compared with calculated values of C, 46.6%, H, 5.1%, and N, 48.3%, confirming the identity of the product; further crystallization gave a nitrogen percentage of 47.7, and a M.P. of 230–235° C.

To an epoxy resin (Epon 828) was added 28% of powdered 2,4-dihydrazino-6-phenylamino-s-triazine and the mixture heated successively, first at 100° C. under a vacuum for ½ hour and then for about 3 hours at 165° C. to produce a cured casting. The casting had a hot hardness at 165° C. of 85 (Shore durometer, A–2 scale), and did not exhibit any flexibility until a temperature of approximately 120° C. was reached.

EXAMPLE 3

2,4-dihydrazino-6-methylamino-s-triazine was prepared as follows:

| Compound | Mol. Wt. | Wt. Gms. | Mols | Solvent |
|---|---|---|---|---|
| A. Cyanuric Chloride | 185 | 37 | 0.2 | 60 ml. dioxane, 100 ml. $H_2O$. |
| B. 40% solution of aqueous $CH_3NH_2$. | 77.5 | 15.5 | 0.2 | |
| C. NaOH | 40 | 8.0 | 0.2 | 20 ml. $H_2O$. |
| D. 85% $NH_2NH_2 \cdot H_2O$ | 59 | 94 | 1.6 | |

B was added to A dropwise at a temperature below 5° C. C was added to A and B under the same condition, the addition of B and C requiring about one hour. D was then added and the mixture stirred at a temperature of 30° C. for two hours, then refluxed for 2 hours, cooled, and filtered. The white, crystalline 2,4-dihydrazino-6-methylamino-s-triazine remaining after filtration was reslurried with water twice and filtered each time. The residue was further washed with water, then air dried. The yield was 29 grams (85%). Drying at 120° C. caused no appreciable weight loss. The sample analysis was as follows:

| Analysis | Calculated | Found |
|---|---|---|
| Percent C | 28.2 | 27.7 |
| Percent H | 5.9 | 6.0 |
| Percent N | 65.9 | 65.8 |

The analysis confirmed the predicted dihydrazino methylamino triazine. The melting point of the compound was from 238–243° C.

To determine the effectiveness of the compound as an epoxy curing agent, 27 grams of the finely powdered compound (2,4-dihydrazino-6-methylamino-s-triazine) were mixed with 121 grams of an epoxy resin (BR–18774) and 20 grams of talc in a Hamilton Beach blender. The resulting thermosetting epoxy resin composition was a thick, honey colored, liquid with no tendency to harden or otherwise show signs of curing at normal room temperatures. In fact, samples of these 2,4-dihydrazino-6-methylamino-s-triazine containing epoxy resin compositions subjected to normal shelf-life conditions for over a year appeared to have undergone no change.

To determine the pot life of the blended 2,4-dihydrazino-6-methylamino-s-triazine and epoxy resin composition of this example, the composition was subjected to a temperature of approximately 100° C. for approximately 4 hours with no material change in the viscosity from about 10 poises (as measured with a Brookfield viscometer, #4 spindle, 30 r.p.m.). Further subjecting the composition to a temperature of 110° C. for 7 hours still revealed no gelling. When placed in a 165° C. oven, the resin cured rapidly in approximately one-half hour to a tough, hard casting which upon cooling and reheating, still possessed excellent rigidity at 165° C.

EXAMPLE 4

2,4-dihydrazino-6-ethylamino-s-triazine was prepared as follows: To a solution of 37 grams of cyanuric chloride in 80 ml. of dioxane and 120 ml. of water, was added a 32.6% aqueous solution of 28 grams of ethylamine at a temperature below 7° C. followed by the addition of 8 g. NaOH dissolved in 20 ml. $H_2O$. 95 ml. of 85% $H_2N-NH_2 \cdot H_2O$ (1.6 mols) was then added to the mixture, raising the temperature to 30–35° C. at which temperature the mixture remained for about 3 hours. Then the mixture was refluxed for 2 hours and subsequently left standing for a period of time (overnight) while the white, crystalline precipitate characterizing the crude 2,4- dihydrazino-6-ethylamino-s-triazine was formed. Upon cooling with ice, further precipitate formed. The precipitate was separated by filtration, then washed in a mixture of 2 parts ice water and 1 part isopropanol and air dried. After oven drying at 120° C. for 1 hour, the yield was 31 grams, or 84%.

The analytical results found as compared to the theoretical calculation for 2,4-dihydrazino-6-ethylamino-s-triazine were as follows:

| Analysis | Calculated | Found |
|---|---|---|
| Percent C | 32.6 | 32.8 |
| Percent H | 6.5 | 6.2 |
| Percent N | 60.9 | 56.8 |

To determine its utility as an epoxy resin curing agent, the 2,4-dihydrazino-6-ethylamino-s-triazine was powdered and blended with an epoxy resin (Epon 834) as follows:

| | Weight, grams |
|---|---|
| Epon 834 | 10. |
| Curing compound | 1.75 (1/4 m./ep. eq.). |
| Talc | 2. |

The resulting resin was heated 20 minutes over a steam bath, then placed in a 165° C. oven. It gelled in 10–13 minutes. Immediately upon removal from the oven after curing approximately one hour, the hardened composition had a hot hardness at 165° C. of 90 (Shore durometer, A–2 scale), and retained its rigidity up to 165° C.

To determine pot life, a second sample of this resin was checked for viscosity at 100° C.

| Time: | Viscosity, Poises |
|---|---|
| 15 minutes | 6 |
| 1 hour | 4 |
| 2 hours | 5 |
| 3 hours | 7 |
| 4 hours | 28 |
| 4½ hours | 82 |

The viscosity was determined using a Brookfield viscometer with a #4 spindle at 30 r.p.m. For most purposes a viscosity of less than 50 poises for a period of 3 hours signifies a satisfactory pot life at 100° C. although, for some purposes the more viscous resins, above 50 poises, are not only acceptable, but desirable.

EXAMPLE 5

5-isopropyl, 2,4-dihydrazino-6-chloropyrimidine was prepared as follows: Isopropyl barbituric acid was reacted with POCl₃ to give trichloro-isopropyl pyrimidine and H₃PO₄: the trichloro pyrimidine was collected as a light yellow solid. The equation for the reaction is believed to be as follows:

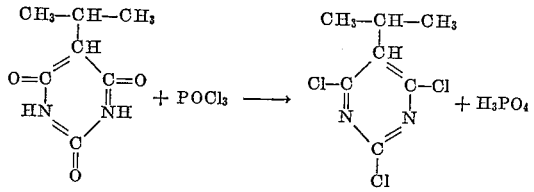

Reacting 50 grams of the isopropyl barbituric acid with 240 ml. of phosphorus oxychloride in a 500 ml. flask and refluxing for 22 hours gave a yield of 32 grams (48%) of the chloro derivative. 28 grams of the chloro compound was powdered and added gradually to 90 ml. (1.5 m.) of 85% hydrazine hydrate at a temperature below 5° C. The temperature rose to about 50° C. After about 1 hour, heat was applied to bring the temperature up to 90–95° C. for about 5 hours. The mixture was then cooled, filtered, and the residue washed with 3 portions of ice water. The residue, after washing, consisted of crystalline powder, melting at about 205° C. The reaction equation is believed to be as follows:

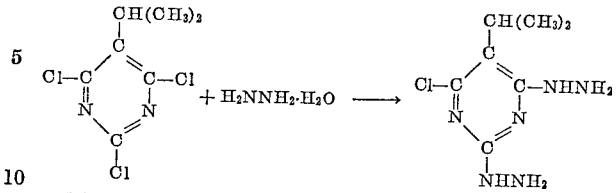

The analysis of the product for 2,4-dihydrazino-5-isopropyl-6-chloropyrimidine was as follows:

| Analysis | Calculated | Found |
|---|---|---|
| Percent C | 38.8 | 39.0 |
| Percent N | 38.8 | 39.6 |
| Percent Cl | 16.4 | 16.4 |

To determine the epoxy resin curing characteristics of the compound, 2.7 grams of the compound were ground fine and blended with 10 grams of an epoxy resin (ERL 2774) and 2 grams of talc on a hot plate. The mixture was then placed in a 120° C. oven, wherein it gelled in 1–2 hrs. The gelled mixture was then placed in a 165° oven for 1 hour where it cured to a tough, hard, infusible casting which was relatively rigid at 165° C.

EXAMPLE 6

2,4-dihydrazino-6-methyl pyrimidine was prepared by reacting 16.2 grams of 2,4-dichloro, 6-methyl pyrimidine with 50 ml. of 85% hydrazine hydrate. The mixture was refluxed for 3 hours and cooled with ice water. Then the crude product, a light yellow precipitate, was separated by filtration, washed and air dried. The crude product was boiled with isopropyl alcohol and refiltered to give a more pure compound having a melting point of around 225° C. (±5°).

1.17 grams of the curing compound were then blended with 16 grams of an epoxy resin (Epon 864) and the blended mixture placed in a 165° C. oven. The mixture gelled in less than 5 minutes, and cured to a tough, hard, infusible casting in approximately ½ hour. The resulting casting, immediately after curing, had a hot hardness at 165° C. of 85 (Shore durometer, A–2 scale) and was rigid at 165° C.

EXAMPLE 7

A mixture of 2,4-dihydrazino-6-ethylamino-s-triazine blended with an epoxy resin in a 1/4 mol/epoxy equivalent ratio was heated in a dip pan at a temperature of approximately 180° F. to give the resinous composition a flowable consistency. A web of parallel, linear, hairlike continuous, glass filaments was fed under tension through the dip pan and then passed through squeeze rollers to shape the thus created reinforced plastic web into a wide sheet comprised of approximately 60% by weight of glass filaments. The reinforced web quickly cooled to a slightly tacky consistency after leaving the squeeze rollers. The tack of the web was sufficient to adhere it to a paper liner having a low adhesion coating. The web and liner were then rolled up for storage, except for a small portion thereof, which was formed into a 15-ply laminate.

The laminate was cured for 35 minutes at 320° F. (approximately) into a rigid panel.

The stored web was found to be unchanged after more than a year of storage at room temperature.

EXAMPLE 8

A 2,4-dihydrazino-6-methylamino-s-triazine-epoxy resin composition was placed in a dip pan and glass reinforced webs made therefrom in the manner set forth in the previous example. Samples of this uncured webbing stored for a period of over half a year remained flexible and slightly tacky with no observable advance in cure.

The high temperature strength of hardened products of this invention is rather remarkable. Comparison of ERL 18774 resin cured with 2,4-dihydrazino-6-methylamino-s-triazine with the same resin cured with the best commercially available latent type heat curing or hardening agents disclosed significantly higher heat distortion temperatures on the part of the triazine cured resin over the comparative curing agent cured resin. The heat distortion temperatures were obtained using ASTM designation D-648-45T, part (a) with an outermost fiber stress on the cured samples of 264 p.s.i. With the triazine cured resin samples over a series of runs, the heat distortion values fell between 155 and 171° C.; with the comparative curing agent cured resin, the highest heat distortion value obtained was 141° C., with the values falling generally into the 130–140° C. category. Although the heat distortion values of both the comparative curing agent cured products and the triazine cured products varied with the particular epoxy resins with which they were blended, i.e., "ERL 18774" or "Epon 828," etc., generally the same approximate amount of difference in heat distortion values was noted. For example, with "Epon 834" as the resin, the triazine cured product had a heat distortion value of 123° C. whereas the comparing curing agent cured product had a heat distortion value of 108° C.

Comparisons with epoxy resins containing melamines of the dihydrazino di- and triazine containing epoxies of this invention confirm the marked superiority of the new resins, which display longer pot life, shorter curing times, and better high temperature stability of the cured products than do melamine cured resins.

To translate the heat distortion figures into more meaningful structural strength figures, two 15-ply panels were prepared and cured by the procedure outlined in Example 7, one panel comprising a 2,4-dihydrazino-6-methylamino-s-triazine cured resin and the other, the best available comparative curing agent cured resin. The results are given in the following table:

| Curing Agent For Resin | Flexural Strength in p.s.i. at— | | | | |
|---|---|---|---|---|---|
| | 70° F. | 200° F. | 250° F. | 300° F. | 350° F. |
| Comparative curing agent | 62,700 | 53,600 | 41,800 | 11,700 | |
| 2,4-dihydrazino-6-methyl-amino-s-triazine | 60,200 | 56,000 | 51,300 | 44,800 | 12,200 |

As will be noted, the panel comprised of the 2,4-dihydrazino-6-methylamino-s-triazino cured epoxy resin retained over 70% of its flexural strength at 300° F. and was nearly four times as strong at that temperature as the panel comprised of the comparative curing agent cured resin.

The resinous compositions of this invention have also proven themselves excellent adhesives, or cements, in bonding materials to one another. To determine the adhesive properties of the resins, the shear strength measuring procedure of U.S. Government military specification MIL-A-5090B was used wherein test panels were prepared in which two .064 inch clad 24S-T3 aluminum oblong sheets conforming to Federal Specification QQ-A-362 were overlapped and bonded along their edges, which edges were previously machined true and smooth before cleaning and bonding. The panels were lapped ½ inch and bonded to one another with epoxy resin-curing agent compositions as appear in the following table. The cure time for each bond was one hour at a temperature in the range of 350–400° F.

Table I

| | Parts by Weight | | |
|---|---|---|---|
| Epoxy Resin (BR 18774) | 100 | 100 | 100 |
| "Cabosil" (finely powdered silica) | 5 | 5 | 5 |
| 2,4-dihydrazino-6-methylamino-s-triazine | 25 | | |
| 2,4-dihydrazino-6-phenylamino-s-triazine | | 30.5 | |
| 2,4,6-trihydrazino-s-triazine | | | 14.1 |

| Temperature, ° F. | Shear Strength, p.s.i. | | |
|---|---|---|---|
| −67 | 2,635 | 2,140 | 1,950 |
| Room temperature | 2,715 | 2,345 | 2,580 |
| 200° F | 3,045 | | 2,830 |
| 300° F | 3,815 | 3,265 | 2,110 |
| 350° F | 1,510 | 1,350 | 1,010 |

The shear results of the table above were determined by gripping each of the test specimens 2 inches (±¼ inch) from each edge of the lap joint, the gripping jaws of the testing machine being directly above each other and in such a position that an imaginary straight vertical line would pass through the center of the bonded area and through the points of suspension. The shear load at failure (the shear strength in the table) is expressed in p.s.i. of the actual shear area, calculated to the nearest .01 inch. The methylamino derivative cured resin surpasses the rigid quality standards of 2500 p.s.i. at −67° F. and 1250 p.s.i. at 180° F. required to qualify under the specification, while the other derivatives are decidedly better than required in the high temperature range and only slightly below at −67° F.

In general, the dihydrazino derivatives are more versatile than the trihydrazino-s-triazine since the latter compound is considered insufficiently soluble in epoxy resins for most purposes and requires a relatively long curing time.

A preferable process in the production of the curing agents of this invention is set forth in Example 9, which follows. In the process described in the previous examples, a large excess (up to 400%) of hydrazine hydrate is necessary to suppress undesirable side reactions. Further, due to the necessity for removing hydrazine hydrochloride from the final products of the previously described process, it is necessary to add an alkaline substance such as NaOH—which while removing the undesirable hydrochloride and regenerating hydrazine also gives a rather difficult product to filter. Using the process of Example 9 less hydrazine is necessitated (20–100% excess) and in general easily filtered products are obtained which have better curing properties than products prepared by the previously described method.

EXAMPLE 9

2,4-dihydrazino-6-methylamino-s-triazino was prepared as follows:

72.6 grams of cyanuric chloride (.4 mol) were dissolved in 90 ml. of warm dioxane and precipitated into 400 ml. of ice water while stirring to form a finely divided suspension. 12.4 grams of methylamine in a 40% aqueous solution (.4 mol) were added to the suspension dropwise. External cooling was used to keep the reaction temperature at 0–5° C. and an aqueous solution of 16 grams of NaOH added at this temperature. Next 75 grams of phenol (.8 mol) and 32 grams of NaOH (.8 mol) were dissolved in 500 ml. of $H_2O$ and the solution cooled to 3° C., then added rapidly to the cold reaction mixture. The cooling bath was removed and the reaction appeared to be mildly exothermic. The reaction mixture was then heated to 98° C. for three hours, cooled, and the resulting 2,4-diphenoxy-6-methyl-amino-s-triazine collected on a filter in 82.5% yield. A sample was recrystallized from butanol and found to have a melting point of 160–165° C. The product was identified as the diphenoxy triazine by C. H. and N analysis:

Calculated: C=65.4%, H=4.8%, N=19.05%.
Found: C=66.2%, H=4.5%, N=17.0%.

Fifty grams of the 2,4-diphenoxy 6-methylamino-s-triazine, 40 grams of 85% hydrazine hydrate and 50 ml. isopropanol were charged with stirring to a flask. The charge was heated 4 hours at 90° C., cooled, and filtered, then washed with water and water-isopropanol to provide an 85% yield of the dihydrazino triazine derivative. The resulting 2,4-dihydrazino 6-methylamino-s-triazine had a melting point of 263–4° C. and on analytical identification checked out exceptionally close to theoretical calculations:

|  | Calculated | Found |
|---|---|---|
| C percent | 28.0 | 28.2 |
| H, percent | 5.8 | 5.92 |
| N, percent | 65.7 | 65.8 |

In view of the relatively insoluble nature of the curing agents of this invention in epoxy resins, to obtain the maximum homogeneity of distribution in the resinous mass a special process is used. This process involves first finely powdering the curing agent, then mixing with an approximately equal amount (±15%) of resin and blending in a paint mill or the like to form a thick paste-like mixture. The pasty mixture is then thoroughly blended into the main body of resin with the resin of the preblended paste-like mixture serving as a carrier to evenly and permanently disperse the curing agent throughout the main body of the resin. When the resin and curing agent are blended in this manner, uniformly cured products invariably result.

EXAMPLE 10

2,4-dihydrazino 6-methyl amino-6-triazine was blended in the manner described hereinbefore with a 1,2-epoxy resin bearing the idealized structure

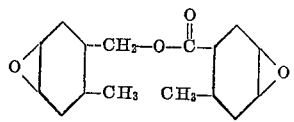

wherein the ring structures are alicyclic. The resin and curing agent were combined in a weight ratio of 100 parts resin to 33.4 parts curing agent, providing a ratio of about 1 hydrazino group for each two epoxy equivalents.

The resulting composition was then subjected to a temperature of 350° F. for 1 hour, resulting in a hard somewhat brittle solid.

A number of other triazine derivatives can be made following the procedures set forth hereinbefore and a number of these have been blended with epoxy resins and cured to hard, strong compositions which preserve their structural strength through a wide temperature range. The shear strengths of some of these triazine curing agents, blended with "ERL 2774" in a ratio of two epoxy equivalents per hydrazino group, and hardened between ½ inch overlapped aluminum panels, in the manner previously described are listed in the table following:

Table II

| 6 Substituted Amino 2,4-Dihydrazino Triazine Identified by Amino Substituents | Approximate Melting Point, ° C. | Shear Strength, p.s.i., at Temperatures Noted | | | | |
|---|---|---|---|---|---|---|
| | | −67 | R.T. | 180° F. | 250° F. | 300° F. |
| propyl | 200 | 3,600 | 3,240 | 3,860 | 5,200 | 4,350 |
| allyl | 158 | 3,800 | 3,100 | 3,660 | 4,400 | 4,400 |
| Ethyl | 195 | 2,610 | 3,620 | 3,000 | 4,700 | 5,000 |
| Benzyl | 195 | 2,480 | 3,340 | 3,020 | 4,150 | 4,500 |
| Methyl | 257 | 3,120 | 2,940 | 3,400 | 3,460 | 3,240 |
| Ethyl hexyl | | 3,390 | 2,850 | 3,450 | 3,600 | 2,350 |
| Isopropyl | 140 | 2,210 | 2,400 | 2,800 | 2,490 | 2,360 |
| Butyl | 165 | 2,360 | 3,860 | 4,500 | 4,300 | 2,570 |
| Hexyl | 166 | 1,380 | 2,940 | 3,240 | 3,230 | 2,680 |
| Hydroxy ethyl | | 1,790 | 1,640 | 2,200 | 2,840 | 1,540 |
| meta xylene bis | 241–245 | 1,680 | 1,700 | 3,500 | 2,300 | 1,840 |
| hexamethylene bis | 227 | 1,875 | 2,300 | 3,090 | 3,100 | 3,020 |
| n-octyl | 163 | 2,155 | 2,400 | 3,500 | 2,700 | 2,400 |
| n-decyl | 161 | 1,170 | 1,700 | 3,120 | 2,200 | 1,775 |

It is to be noted that epoxy resins blended with the allyl and isopropyl derivatives of the table, while having somewhat short storage lives; e.g. 3 to 6 months, cure in relatively short times at temperatures as low as 200° F., well within the temperature range for low temperature industrial bonding of many structural materials to one another.

While the preferred numerical range of carbon atoms in the various alkyl, alkenyl and alkylene groups of the triazines has been noted in the identification of useful Y forming substituents, it is to be understood that these ranges are not precise but were selected as providing the most practical compounds from the standpoints of availability, solubility, strength, storage stability and/or other factors bearing on the best commercial applications of these new epoxy curing agents; thus, variants beyond these specified numerical ranges may achieve equivalent results in many instances and such variants are included within the ambit of the invention.

In this connection, some substitution is permissible on the alkyl, alkenyl and alkylene and other substituent groups without departing from the spirit of the invention as is apparent from the operability of hydroxy ethyl substituent noted in Table II.

The superior operability of the curing compounds of this invention is believed attributable in large measure to the presence of a plurality of reactive hydrazino groups. These hydrazino groups are carried by the carbon atoms of stable 6 membered carbo-nitrogen heterocyclic, conjugated, ring structures wherein the carbon atoms of the ring separate the ring nitrogen atoms from one another, and the compounds are free from groups which detract from the reactivity of the hydrazino groups. Thus, stable but aggressively reactive hydrogen carrying groups are provided for reaction with oxirane oxygen upon the application of heat.

The ratio of epoxy equivalents to hydrazino groups can be varied within wide limits and, while a preferred range has been set forth herein, it will be apparent that operation outside this range will result in predictable plasticizing with less than the preferred number of hydrazino groups present and more brittle products with more than the preferred number of such groups present.

I claim:

1. A composition of matter comprising a blend of an epoxy resin having an average of more than one 1,2-epoxy group per average molecular weight, and a 6-membered, carbo-nitrogen-heterocyclic ring compound represented by the formula:

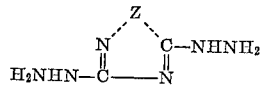

wherein Z is an asymmetrically substituted bivalent radical selected from the group consisting of

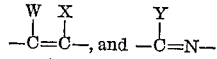

W being a member selected from the group consisting of hydrogen and chlorine, X being a member selected from the group consisting of hydrogen and a lower alkyl containing from 1 to about 4 carbon atoms, and Y being a member of the group consisting of alkylamino, dialkylamino and aralkylamino radicals containing from 1 to about 10 carbon atoms in the alkyl groups thereof, amino, hydrazino, and arylamino radicals, alkenylamino radicals containing from 2 to about 5 carbon atoms, and

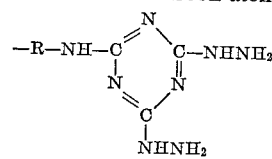

wherein R is selected from the group consisting of alkylene-amino and aralkylene-amino radicals containing from 2 to about 10 carbon atoms in the alkylene chains.

2. The composition of claim 1 wherein the ring compound is a 2,4-dihydrazino-6-alkyl pyrimidine.

3. A composition of matter comprising a blend of an epoxy resin having an average of more than one 1,2-epoxy group per average molecular weight, and a 6-membered, carbo-nitrogen-heterocyclic ring compound represented by the formula

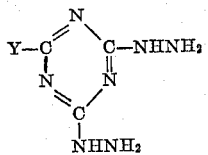

wherein Y is a member selected from the group consisting of alkylamino, dialkylamino and aralkylamino radicals containing from 1 to about 10 carbon atoms in the alkyl groups thereof, amino, hydrazino, and arylamino radicals, alkenylamino radicals containing from 2 to about 5 carbon atoms, and

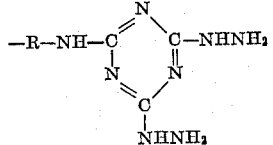

wherein R is selected from the group consisting of alkylene-amino and aralkylene-amino radicals containing from 2 to about 10 carbon atoms in the alkylene chains.

4. The composition of claim 3 wherein the ring compound is 2,4-dihydrazino-6-methylamino-s-triazine.

5. The composition of claim 3 wherein the ring compound is 2,4-dihydrazino-6-ethylamino-s-triazine.

6. The composition of claim 3 wherein the heterocyclic compound is 2,4-dihydrazino-6-allylamino-s-triazine.

References Cited in the file of this patent

UNITED STATES PATENTS 2,771,434   De Groote et al. -------- Nov. 20, 1956

FOREIGN PATENTS 133,819   Australia -------------- Aug. 10, 1949

OTHER REFERENCES

Cyanamid's Nitrogen Chemicals Digest, "The Chemistry of Cyanuric Chloride," pages 11–15 (1951).